(12) United States Patent
Singhee

(10) Patent No.: US 10,657,547 B2
(45) Date of Patent: May 19, 2020

(54) FORECAST MODEL CALIBRATION

(71) Applicant: International Business Machines Corporation, Armonk, NY (US)

(72) Inventor: Amith Singhee, Bangalore (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 524 days.

(21) Appl. No.: 15/287,873

(22) Filed: Oct. 7, 2016

(65) Prior Publication Data

US 2017/0278116 A1    Sep. 28, 2017

Related U.S. Application Data

(60) Provisional application No. 62/313,901, filed on Mar. 28, 2016.

(51) Int. Cl.
*G06Q 30/02* (2012.01)
*G06Q 10/06* (2012.01)

(52) U.S. Cl.
CPC ... *G06Q 30/0202* (2013.01); *G06Q 10/06315* (2013.01)

(58) Field of Classification Search
CPC .............................. G06Q 10/00; G06Q 40/00
USPC ........................................................ 705/7.23
See application file for complete search history.

(56) References Cited

U.S. PATENT DOCUMENTS 7,693,806 B2    4/2010  Yih et al.
7,702,615 B1*   4/2010  Delurgio ............... G06F 16/283
                                                     707/781
8,271,369 B2*   9/2012  Gilmore ................. G06Q 10/06
                                                        705/35
8,868,736 B2   10/2014  Bowler et al.
9,228,834 B2    1/2016  Kidd et al.
9,274,849 B1*   3/2016  Estes ..................... G06F 9/5072
                                  (Continued)

OTHER PUBLICATIONS

Di "Demand Forecast, Resource Allocation and Pricing for Multimedia Delivery from the Cloud", Jun. 2013, Doctor of Philosophy Thesis Edward S. Rogers Sr. Dept. of Electrical and Computer Engineering University of Toronto, pp. 1-211. (Year: 2013).*

(Continued)

*Primary Examiner* — Romain Jeanty

(74) *Attorney, Agent, or Firm* — Cantor Colburn LLP; Joseph Petrokaitis

(57) ABSTRACT

A system and method perform calibration of a forecast model for resource allocation. The method includes receiving inputs to the forecast model derived from historical data for a period of time, and executing the forecast model to obtain one or more forecast levels for each interval within the period of time, the forecast level corresponding with a quantified forecast of a forecast parameter that is forecast by the forecast model for the interval. Obtaining an actual level for each interval within the period of time according to the historical data is followed by comparing the one or more forecast levels with the actual level for the period of time according to a metric to adjust a mapping within the forecast model between values of the quantified forecast and the forecast levels based on the comparing to obtain a calibrated forecast model. The calibrated forecast model is used for resource allocation.

20 Claims, 3 Drawing Sheets

(56) References Cited

U.S. PATENT DOCUMENTS

| | | | |
|---|---|---|---|
| 9,881,339 B2* | 1/2018 | Mun | G06Q 40/06 |
| 2008/0221949 A1* | 9/2008 | Delurgio | G06Q 10/04 |
| | | | 705/7.11 |
| 2008/0306802 A1* | 12/2008 | Ginsberg | G06Q 10/06 |
| | | | 705/7.12 |
| 2009/0024407 A1* | 1/2009 | Shan | G06Q 10/04 |
| | | | 705/348 |
| 2009/0030864 A1 | 1/2009 | Pednault et al. | |
| 2009/0300173 A1* | 12/2009 | Bakman | G06F 11/008 |
| | | | 709/224 |
| 2010/0017239 A1* | 1/2010 | Saltzman | G06Q 10/00 |
| | | | 705/7.31 |
| 2013/0232103 A1 | 9/2013 | Saeed | |
| 2014/0324521 A1* | 10/2014 | Mun | G06Q 10/06393 |
| | | | 705/7.28 |
| 2015/0088606 A1* | 3/2015 | Tyagi | G06Q 30/0202 |
| | | | 705/7.31 |
| 2016/0005055 A1* | 1/2016 | Sarferaz | G06Q 30/0202 |
| | | | 705/7.31 |

OTHER PUBLICATIONS

Li et al., "A statistical model for risk management of electric outage forecasts", IBM Journal of Research and Development, vol. 54, No. 3, 2010, pp. 1-11.

Lizorkin et al., "Accuracy Estimate and Optimization Techniques for SimRank Computation", VLDB Journal, vol. 19, No. 1, 2010, pp. 45-66.

Shankle et al., "Simple Models for Estimating Dementia Severity Using Machine Learning", Studies in Health Technology and Informatics, 1998, pp. 1-5.

Tian et al., "Information Retrieval Based Nearest Neighbor Classification for Fine-Grained Bug Severity Prediction", 19th Working Conference on Reverse Engineering, 2012, pp. 215-224.

* cited by examiner

FORECAST MODEL CALIBRATION

DOMESTIC PRIORITY

This application is a non-provisional application of U.S. Provisional Application Ser. No. 62/313,901 filed Mar. 28, 2016, the disclosure of which is incorporated by reference herein in its entirety.

BACKGROUND

The present invention relates to forecasting, and more specifically, to forecast model calibration.

Forecasting is used in a number of planning and resource allocation scenarios. For example, during a natural disaster, a utility may use damage forecasts to perform crew allocation. This planning and allocation helps ensure that the necessary crews and equipment are available to expedite repair of the damage and restore service. As another example, an online retailer may use forecasting to obtain sufficient inventory to fill orders during increased sale cycles, such as Cyber Monday. The forecasting model may rely on historical data and current inputs.

SUMMARY

According to an embodiment of the present invention, a computer-implemented method of performing calibration of a forecast model for resource allocation includes receiving inputs to the forecast model derived from historical data for a period of time; executing, using a processor, the forecast model to obtain one or more forecast levels for each interval within the period of time, wherein the forecast level corresponds with a quantified forecast of a forecast parameter that is forecast by the forecast model for the interval; obtaining an actual level for each interval within the period of time according to the historical data; comparing the one or more forecast levels with the actual level for the period of time according to a metric; adjusting a mapping within the forecast model between values of the quantified forecast and the forecast levels based on the comparing to obtain a calibrated forecast model; and performing resource allocation based on calibrated forecast levels output by the calibrated forecast model, wherein allocating resources includes deploying equipment and personnel, scheduling maintenance, ordering retail inventory, allocating compute resources, or prioritizing activities.

According to another embodiment, a system to calibrate a forecast model for resource allocation includes a memory device configured to store historical data; and a processor configured to receive inputs to the forecast model derived from the historical data for a period of time, execute the forecast model to obtain a forecast level for each interval with in the period of time, obtain an actual level for each interval within the period of time according to the historical data, compare the one or more forecast levels with the actual level according to a metric, and adjust a mapping within the forecast model between the quantified forecast and the forecast levels to improve a result of the comparing and obtain a calibrated forecast model, wherein the calibrated forecast model is used to deploy equipment and personnel, schedule maintenance, order retail inventory, allocate compute resource, or prioritize activities.

According to yet another embodiment, a computer program product for calibrating a forecast model to perform resource allocation includes a computer readable storage medium having program instructions embodied therewith. The program instructions are executable by a processor to perform a method that includes receiving inputs to the forecast model derived from historical data for a period of time; executing the forecast model to obtain one or more forecast levels for each interval within the period of time, wherein the forecast level corresponds with a quantified forecast of a forecast parameter that is forecast by the forecast model for the interval; obtaining an actual level for each interval within the period of time according to the historical data; comparing the one or more forecast levels with the actual level for the period of time according to a metric; adjusting a mapping within the forecast model between values of the quantified forecast and the forecast levels based on the comparing to obtain a calibrated forecast model; and performing resource allocation based on calibrated forecast levels output by the calibrated forecast model, wherein allocating resources includes deploying equipment and personnel, scheduling maintenance, ordering retail inventory, allocating compute resources, or prioritizing activities.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
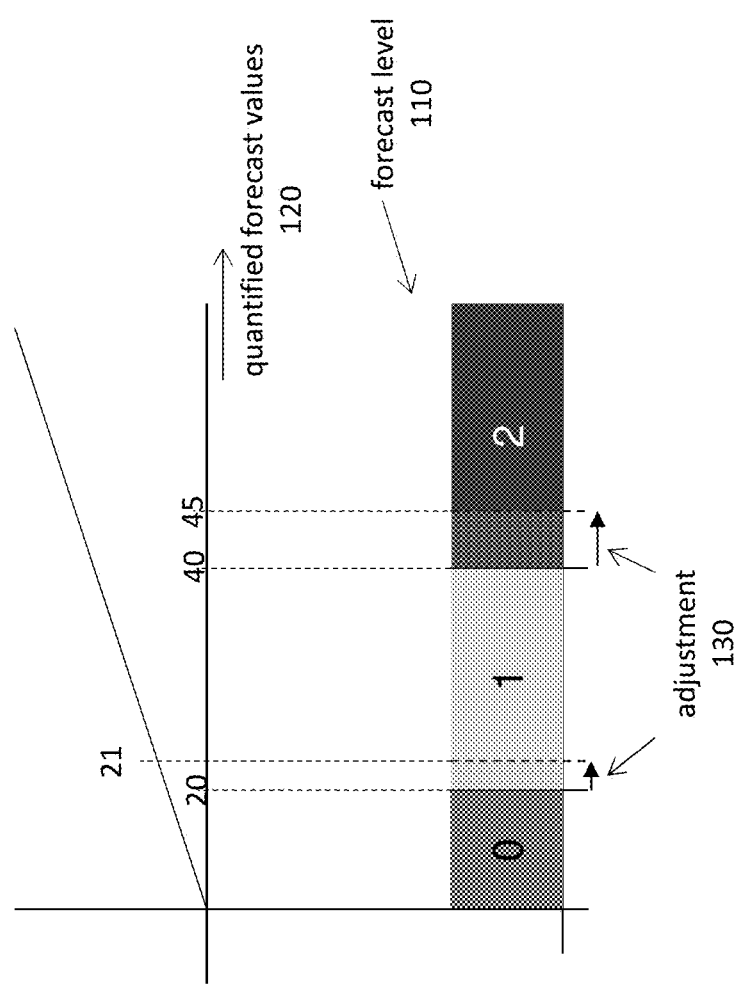
FIG. 1 illustrates the adjustment involved in the calibration according to an embodiment.

As noted above, forecasting models are used in planning in a variety of areas. As non-limiting examples, the forecast may be of damage to plan for repair tasks or of demand to plan for inventory or personnel availability. To aid in planning, the forecast must provide a quantified prediction. That is, the forecast must predict a level (e.g., of damages, of sales, of traffic) that corresponds with a planning level. For example, in the case of a utility planning for repair of damage, severity of damage may be quantified in a way that facilitates the planning. To continue with this non-limiting example of forecasting, the quantified prediction may be a level corresponding to the number of open tasks that are created due to the damage. This level may then correspond with a crew planning level, as shown in Table 1.

TABLE 1

Quantified forecast and corresponding planning level.

| Level | number of open jobs | crew level |
|---|---|---|
| 0 | ≤20 | 8-hour shifts of regular crew |
| 1 | 21-40 | 16-hour shifts of regular crew |
| 2 | >40 | additional crews needed |

When the forecast does not output the correct level, the corresponding planning is negatively affected. That is, if the output of the exemplary forecast model associated with Table 1 were level 2 when it should be level 1, then additional crews may be unnecessarily deployed. As another example, if level 0 were output by the exemplary forecast model associated with Table 1 when level 1 should have been output, then crews may not be informed that 16-hour shifts will be needed. Thus, when a forecast model is developed, the model must be calibrated or refined to ensure that the forecast parameter (e.g., damage, demand, traffic) is correctly quantified. A prior approach to improving the accuracy of the quantified prediction involves modifying the forecast model itself.

Turning now to an overview of the present disclosure, one or more embodiments provide calibration methodologies and processes for forecast models. The quantified prediction that is output by the forecast model corresponds with a forecast level. Quantified prediction and quantified forecast are used interchangeably herein and both are associated with the forecast parameter (e.g., damage, traffic, open jobs) of interest. The exemplary forecast levels shown in Table 1 above are 0, 1, and 2. These forecast levels correspond with quantified forecasts (e.g., <20 open jobs, 21-40 open jobs) of the forecast model. The embodiments detailed herein relate to adjusting or calibrating the correspondence between quantified forecasts (e.g., number of open jobs) and forecast levels rather than modifying the forecast model itself. More specifically, historical data is used to calibrate a forecast model. The forecast model is executed over a period of time (e.g., 1000 days) for which real (historical) data is also available. The forecast level output by the forecast model for each interval (e.g., each day, each hour) over the period of time is compared with the actual level according to the real data. The mapping between the quantified forecast (e.g., number of open jobs) and forecast level is adjusted in order to obtain a match (according to specified criteria) between the forecast level and the actual level. The adjustments that provide matches between the forecast level and the actual level over the highest number of intervals are retained as the calibration result. The calibration is transparent to an end-user of the forecast model. The calibration facilitates improved planning. In the one or more embodiments detailed herein, planning refers to a variety of resource allocation tasks. The specific tasks are dictated by the application of the forecast model. Exemplary allocation tasks include deployment of equipment and personnel, scheduling maintenance, ordering retail inventory, allocating compute resources, and prioritizing activities.

Turning now to a more detailed description of one or more embodiments, FIG. 1 illustrates the adjustment involved in the calibration according to an embodiment. The example shown in Table 1 is used again for explanatory purposes. Quantified forecast values 120 and their correspondence with forecast levels 110 is shown. FIG. 1 shows that, initially, a quantified forecast value 120 of up to 20 corresponded with a forecast level 110 of 0, and a forecast value 120 between 20 and 40 corresponded with a forecast level 110 of 1. The adjustment 130 (calibration) results in a correspondence between a quantified forecast value 120 of up to 21 with a forecast level of 0 and a correspondence between quantified forecast values 120 between 21 and 45 with a forecast level of 1.

FIG. 1 is a simplified example, because the forecast model does not generally output a single forecast level but can instead indicate a probability for two or more forecast levels. That is, the forecast level for a given time interval may be provided by the forecast model as shown in Table 2.

TABLE 2

Exemplary forecast level output by a forecast model.

| Level | output probability |
|---|---|
| 0 | 0.6 |
| 1 | 0.3 |
| 2 | 0.1 |

Thus, whether the forecast level matches the actual level (according to historic data) is not a straight-forward decision but instead may be determined based on a selected metric. Exemplary metrics are further discussed below. One exemplary metric may be applied to each interval (e.g., each day within a 1000 day history). The metric may be applied to the forecast level with the highest probability. Thus, in the exemplary forecast level shown in Table 2, level 0 (the level with the highest associated probability) would be compared with the actual level for the given time interval. Another exemplary metric may be applied over the full range of time (e.g., all 1000 days of historical data available) or sub-ranges (e.g., 100 days per sub-range). The metric may consider a threshold level for the average probability of incorrect forecast levels. That is, over a sub-range of two days, for example, the forecast levels may be provided by a forecast model as shown in Table 3.

Exemplary forecast levels output by a forecast model for two days.

| Level | Day 1 | Day 2 |
|---|---|---|
| A | 0.2 | 0.4 |
| B | 0.6 | 0.5 |
| C | 0.2 | 0.1 |

If the correct level for day 1 is B, then the probabilities associated with the wrong levels (levels A and C) are 0.2 and 0.2. If the correct level for day 2 is A, then the probabilities associated with the wrong levels (levels B and C) are 0.5 and 0.1. The average probability associated with the wrong levels for the sub-range of two days is then 0.5. This value (0.5) would be compared with the threshold. The embodiments detailed herein are not limited to any one or several metrics for comparing the forecast levels with the actual levels. Based on the comparison, the association between quantified predictions and forecast levels may be adjusted within the forecast model, as further discussed below.

Figure 2:
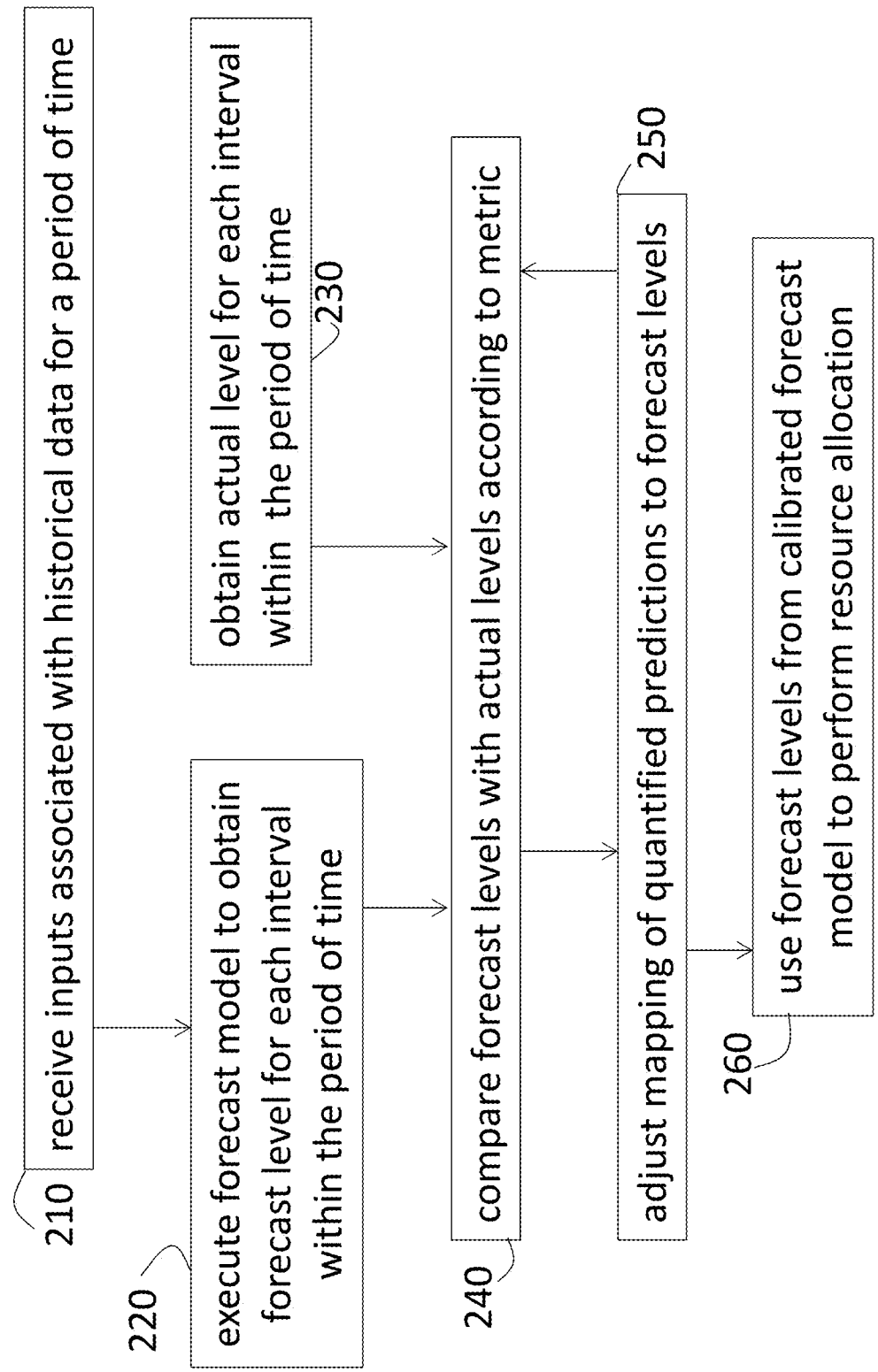
FIG. 2 is a process flow of a method of calibrating a forecast model according to embodiments.

FIG. 2 is a process flow of a method of calibrating a forecast model according to embodiments to facilitate resource allocation. Receiving inputs associated with historical data for a period of time, at block 210, refers to the forecast model receiving the inputs derived from the historical data that are required to execute the model. In the exemplary case of utility damage prediction, the inputs may include weather forecast information and equipment location information. Executing the forecast model to obtain a forecast level for each interval within the period of time, at block 220, refers to obtaining a forecast level for each day within a 30 day period for which historical data is available, for example. Obtaining an actual level for each interval within the period of time, at block 230, may refer to determining the level according to the default mapping of a parameter to a level (e.g., the mapping shown in Table 1 of the number of open jobs (the parameter) to crew level).

At block 240, comparing the forecast levels with actual levels is according to a selected metric or goodness metric, which is further discussed below. The intervals within the period of time for which historical data is available may be selected (at blocks 220 and 230) to ensure that actual levels are available for comparison with forecast levels. As noted previously, the forecast level may be provided by the forecast model as a probability associated with each level. The metric may consider the forecast level with the highest probability and compare the forecast level with the highest probability with the actual level for each interval, for example. The metric may instead involve the probability associated with the forecast level(s) that are not the actual level and make a comparison based on a threshold, as discussed in the example above. The specific metric used according to alternate embodiments is not limited and addition discussion of exemplary metrics is provided below.

At block 250, adjusting the mapping of quantified predictions to forecast levels may be performed iteratively, as shown in FIG. 1. The adjusting may be completed when further adjustment reduces the improvement (of the result at block 240) according to the selected metric. The adjusting is further discussed below, as well. The adjustment, at block 250, must be consistent over all the intervals. That is, the adjustment cannot be such that the quantified prediction values (e.g., number of open jobs) from 0 to 20 correspond with level 0 in one interval and the quantified prediction values from 0 to 22 correspond with level 0 in another interval. The ultimately calibrated model must have a single mapping from quantified prediction values to forecast levels. Thus, the adjustment in the mapping must ultimately provide an improvement over the entire period of time. Once the calibration or adjustment is completed, the processes include using the forecast levels from the calibrated forecast model to perform allocation, at block 260. Based on the calibration and on the specific application of the forecast model, the allocation refers to deployment of equipment and personnel, maintenance scheduling, retail inventory ordering, compute resource scheduling, or activity prioritization, for example.

Figure 3:
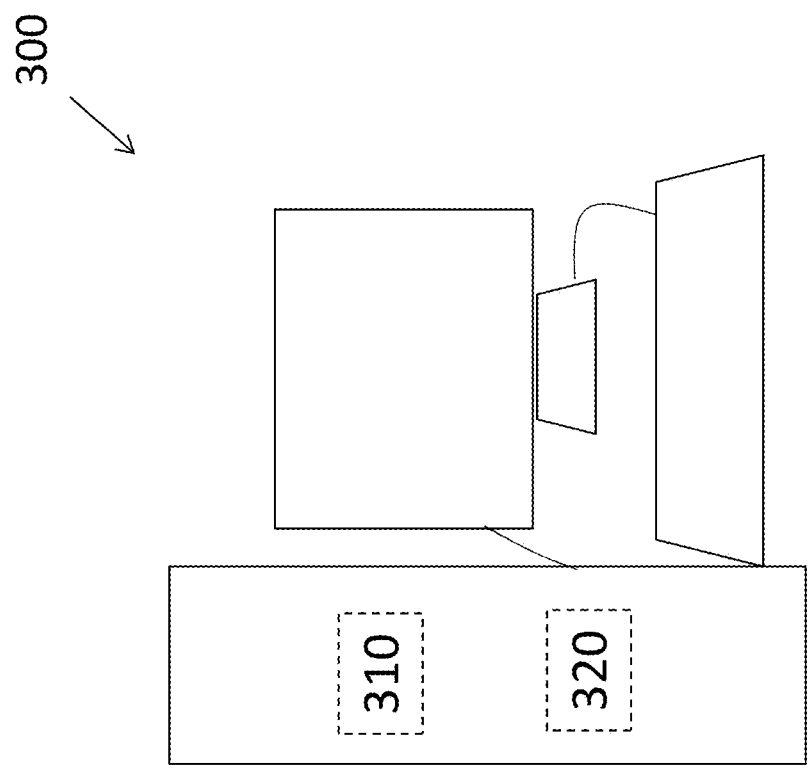
FIG. 3 is a block diagram of a computing system configured to calibrate a forecast model according to embodiments.

FIG. 3 is a block diagram of an exemplary computing system 300 that performs the processes shown in FIG. 2 to calibrate a forecast mode. The system 300 includes one or more memory devices 310 and one or more processors 320. The memory device 310 stores instructions implemented by the processor 320. These instructions include the processes discussed with reference to FIG. 2 that are used to calibrate the forecast model. The memory device 310 may additionally store the historical information used in the calibration.

As previously noted, the processes of comparing the forecast levels with actual levels, at block 240, and adjusting the mapping of the quantified forecast to the forecast levels, at block 250, can be performed according to a number of embodiments. For m forecast levels, the lower bound associated with the $i^{th}$ forecast level is $l_i$ and the upper bound is $u_i$. Continuing the previous example, the lower and upper bounds are bounds on the range of open jobs associated with the $i^{th}$ level, for example. In an exemplary embodiment, the ranges of open jobs increase for increasing forecast levels. That is, $l_i < l_{i+1}$ and $u_i < u_{i+1}$. The adjusting, at block 250, refers to identifying the value of $l_i$ for each forecast level. The comparing, at block 240, is according to a metric that is referred to, for explanatory purposes, as a goodness metric. Thus, at blocks 240 and 250, the optimal lower and upper bounds are identified to meet a goodness metric according to a function which is referred to as a tuneThreshold function for explanatory purposes. Generally, the bounds for each forecast level can be adjusted iteratively until a criterion in terms of the goodness metric is met. The adjustment may also be stopped once a certain subset of possible values has been tried. The subset may include all possible values.

Several examples of goodness metric are discussed, but these exemplary metrics are not intended to limit the conditions that can form the basis for adjustment (or stopping adjustment) of the forecast levels. When a historical data set is divided into N intervals, the $j^{th}$ interval is associated with a quantified forecast denoted by $f_j$, which has a cumulative probability distribution of $p_j(x)$, where x is any possible value for the forecast parameter. When the lower bound is $l_i$ tuned, for example, the actual severity level for the jth interval is denoted as $L_j$. Then, Table 4 indicates quantities that may be defined and Table 5 indicates exemplary goodness metrics based on the quantities. Similar quantities can be defined for the upper bound of the forecast level, and similar goodness metrics can be used. That is, in an alternate embodiment, the upper bound of each range associated with each forecast level can be optimized. Because the upper bound of the previous forecast level defines the lower bound of the next forecast level or, looking at it another way, because the lower bound of a given forecast level defines the upper bound of the previous forecast level, only one of the bounds needs to be determined in order to tune the forecast model.

TABLE 4

Exemplary quantities used to determine a goodness metric.

| Quantity | calculation |
|---|---|
| true positive probability sum (TPP) | $\sum_{j:L_j \geq i} (1 - p_j(l_i))$ |
| false positive probability sum (FPP) | $\sum_{j:L_j < i} (1 - p_j(l_i))$ |
| false negative probability sum (FNP) | $\sum_{j:L_j \geq i} (p_j(l_i))$ |

TABLE 5

Exemplary goodness metrics.

| Goodness metric | calculation |
|---|---|
| average hit probability (AVGHITPROB) | $k * \dfrac{TPP}{N}$ |
| negative false probability (NEGFALSEPROB) | $-k * (FNP + FPP)$ |
| negative false probability (NEGFALSEPOSPROB) | $-k * FPP$ |
| negative false probability (NEGFALSENEGPROB) | $-k * FNP$ |
| critical success index (CRITICALSUCCESSINDEX) | $\dfrac{k * TPP}{TPP + FPP + FNP}$ |

Exemplary tuneThreshold functions are detailed, but the examples are not intended to limit the adjustment of the mapping between quantified predictions and forecast levels. Generally, the tuneThreshold function selects a value for the lower bound within a search range. The selected value is one that results in the highest value for the goodness metric, for example. According to an exemplary embodiment, the tuneThreshold function samples multiple values within the search range, evaluates the goodness metric that would result for each value, and selects the value associated with the highest value of the goodness metric. The sampling of multiple potential lower bound values can be done in one of several ways. For a finite search range, the sampling of potential lower bound values can be an exhaustive sampling such that each value within the search range is tried. In alternate embodiments, the sampling can be random (e.g., Monte Carlo sampling method) or deterministic (e.g., Quasi-Monte Carlo method).

According to another embodiment, the tuneThreshold function can perform a binary search within the search range. In yet another embodiment, the tuneThreshold function can use gradient descent search starting from either end of the search range or from a value within the search range. A quadratic programming can be used according to one exemplary embodiment such that the relationship between the goodness metric and the lower bound value is estimated as a quadratic function and the minimum of the quadratic function within the search range is computed analytically. In yet another embodiment, the tuneThreshold function can use heuristic optimization methods such as simulated annealing, genetic programming, and particle swarm optimization to determine the lower bound.

According to another alternate embodiment, the tuneThreshold function can use sequential quadratic programming. The relationship between the goodness metric and the lower bound value is estimated as a quadratic function only within a small neighborhood around the starting point. The function computes the minimum, subsequently re-estimates the quadratic function in the neighborhood around the minimum, re-computes a new minimum, and continues iteratively until some convergence criterion in met. An exemplary convergence criterion is that the distance between successive minima is smaller than some pre-decided threshold.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of performing calibration of a forecast model for resource allocation, the method comprising:
 receiving inputs to the forecast model derived from historical data for a period of time;
 executing, using a processor, the forecast model to obtain one or more forecast levels for each interval within the period of time, wherein the forecast level corresponds with a quantified forecast of a forecast parameter that is forecast by the forecast model for the interval;
 obtaining, using the processor, an actual level for each interval within the period of time according to the historical data;
 comparing, using the processor, the one or more forecast levels with the actual level for the period of time according to a metric;
 adjusting, using the processor, a mapping within the forecast model between values of the quantified forecast and the forecast levels based on the comparing to obtain a calibrated forecast model; and
 deploying resources, using the processor, based on calibrated forecast levels output by the calibrated forecast model, wherein the deploying resources includes deploying equipment and personnel, scheduling maintenance, ordering retail inventory, allocating compute resources, or prioritizing activities.

2. The method according to claim 1, wherein obtaining the one or more forecast levels includes obtaining a probability associated with each forecast level.

3. The method according to claim 2, wherein the comparing the one or more forecast levels with the actual level includes computing a quantity based on the probability associated with each forecast level.

4. The method according to claim 3, further comprising determining the metric based on the quantity.

5. The method according to claim 1, wherein the obtaining the actual level includes determining the actual value that corresponds with an actual value of the forecast parameter.

6. The method according to claim 1, wherein the adjusting the mapping includes determining a lower bound of a range of values of the quantified forecast that correspond with each forecast level.

7. The method according to claim 6, wherein the determining the range of values is based on an exhaustive sampling, a random sampling, or a deterministic sampling.

8. The method according to claim 6, wherein the determining the range of values is based on a binary search, a gradient descent search, quadratic programming, heuristic optimization, or sequential quadratic programming.

9. A system to calibrate a forecast model for resource allocation, the system comprising:
 a memory device configured to store historical data; and
 a processor configured to receive inputs to the forecast model derived from the historical data for a period of time, execute the forecast model to obtain a forecast level for each interval with in the period of time, obtain an actual level for each interval within the period of time according to the historical data, compare the one or more forecast levels with the actual level according to a metric, and adjust a mapping within the forecast model between the quantified forecast and the forecast levels to improve a result of the comparing and obtain a calibrated forecast model, wherein the calibrated forecast model is used to deploy equipment and personnel, schedule maintenance, order retail inventory, allocate compute resource, or prioritize activities.

10. The system according to claim 9, wherein the processor obtains the one or more forecast levels based on obtaining a probability associated with each forecast level.

11. The system according to claim 10, wherein the processor compares the one or more forecast levels with the actual level based on computing a quantity based on the probability associated with each forecast level and determining the metric based on the quantity.

12. The system according to claim 9, wherein the processor adjusts the mapping based on determining a lower bound of a range of values of the quantified forecast that correspond with each forecast level.

13. The system according to claim 12, wherein the processor determines the range of values based on an exhaustive sampling, a random sampling, a deterministic sampling, a binary search, a gradient descent search, quadratic programming, heuristic optimization, or sequential quadratic programming.

14. A computer program product for calibrating a forecast model to perform resource allocation, the computer program product comprising a computer readable storage medium having program instructions embodied therewith, the program instructions executable by a processor to perform a method comprising:
 receiving inputs to the forecast model derived from historical data for a period of time;

executing the forecast model to obtain one or more forecast levels for each interval within the period of time, wherein the forecast level corresponds with a quantified forecast of a forecast parameter that is forecast by the forecast model for the interval;

obtaining an actual level for each interval within the period of time according to the historical data;

comparing the one or more forecast levels with the actual level for the period of time according to a metric;

adjusting a mapping within the forecast model between values of the quantified forecast and the forecast levels based on the comparing to obtain a calibrated forecast model; and deploying resources based on calibrated forecast levels output by the calibrated forecast model, wherein the deploying resources includes deploying equipment and personnel, scheduling maintenance, ordering retail inventory, allocating compute resources, or prioritizing activities.

15. The computer program product according to claim 14, wherein obtaining the one or more forecast levels includes obtaining a probability associated with each forecast level.

16. The computer program product according to claim 15, wherein the comparing the one or more forecast levels with the actual level includes computing a quantity based on the probability associated with each forecast level.

17. The computer program product according to claim 16, further comprising determining the metric based on the quantity.

18. The computer program product according to claim 14, wherein the obtaining the actual level includes determining the actual value that corresponds with an actual value of the forecast parameter.

19. The computer program product according to claim 14, wherein the adjusting the mapping includes determining a lower bound of a range of values of the quantified forecast that correspond with each forecast level.

20. The computer program product according to claim 19, wherein the determining the range of values is based on an exhaustive sampling, a random sampling, a deterministic sampling, a binary search, a gradient descent search, quadratic programming, heuristic optimization, or sequential quadratic programming.

* * * * *